United States Patent [19]
Musket

[11] Patent Number: 5,398,442
[45] Date of Patent: Mar. 21, 1995

[54] COMBINATION GLUE TRAP AND PACKAGE

[75] Inventor: David C. Musket, Kutztown, Pa.

[73] Assignee: Woodstream Corporation, Lititz, Pa.

[21] Appl. No.: 136,361

[22] Filed: Oct. 15, 1993

[51] Int. Cl.$^6$ .................. A01M 1/14; A01M 23/00
[52] U.S. Cl. ........................... 43/114; 43/58; 229/120.09
[58] Field of Search ............ 43/114, 115, 131, 136, 43/58, 124, 121; 229/120.09, 120.011, 168; 206/806

[56] References Cited

U.S. PATENT DOCUMENTS

| | | |
|---|---|---|
| 393,273 | 11/1888 | Thum . |
| 469,021 | 2/1892 | Smith . |
| 793,871 | 7/1905 | Bien . |
| 1,411,931 | 4/1922 | Pfeiffer, Sr. . |
| 3,304,646 | 2/1967 | Staley ........................... 43/131 |
| 3,326,447 | 6/1967 | Williamson .................. 229/168 |
| 3,398,478 | 8/1968 | Pearsall ......................... 43/58 |
| 3,913,259 | 10/1975 | Nishimura et al. ............ 43/114 |
| 4,031,654 | 6/1977 | Gray ............................. 43/114 |
| 4,103,448 | 8/1978 | Souza ............................ 43/67 |
| 4,385,465 | 5/1983 | Palmeri ......................... 43/58 |
| 4,425,731 | 1/1984 | Orlando ........................ 43/58 |
| 4,438,584 | 3/1984 | Baker et al. ................... 43/114 |
| 4,485,581 | 12/1984 | Roccaforte .................... 43/121 |
| 4,959,924 | 10/1990 | Martin .......................... 43/114 |
| 5,048,224 | 9/1991 | Frisch ........................... 43/114 |

FOREIGN PATENT DOCUMENTS 53-5224 2/1978 Japan ........................... 43/114

*Primary Examiner*—P. Austin Bradley
*Assistant Examiner*—Jeanne M. Elpel
*Attorney, Agent, or Firm*—Jacobson, Price, Holman & Stern

[57] ABSTRACT

Glue trays for trapping mice and other rodents or insects are designed to form their own packaging. Thus, a glue tray package is formed by a blank of paperboard sheet folded into a pair of trays which are connected along one common edge. The trays are folded on each other rim to rim and releasably connected by a perforated tear strip. No outer packaging is required. For use, the tear strip is torn away and, the trays are opened out. The common edge between the trays can be perforated to allow separation of the trays themselves. Each tray is provided with a layer of non-drying adhesive.

9 Claims, 3 Drawing Sheets

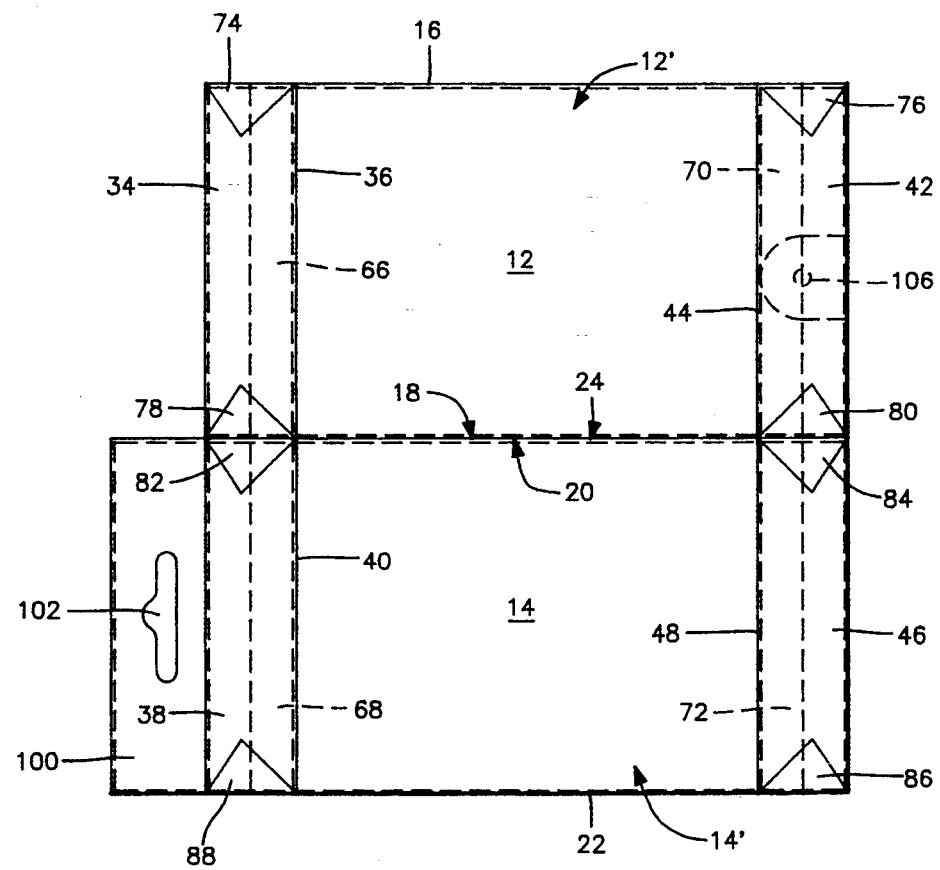

COMBINATION GLUE TRAP AND PACKAGE

BACKGROUND OF THE INVENTION

This invention relates to glue traps which use a non-drying very sticky adhesive for trapping insects, vermin and rodents such as cockroaches, rats and mice. Glue traps of this nature are well known in the art and are available in many different forms for different applications.

The present invention is more particularly concerned with a type of glue trap which is in the form of a shallow tray having an interior glue layer in the bottom of the tray and which is used particularly for catching mice. Thus, in use, the tray is placed, for example, on the floor of an infested area and when a mouse steps into the tray it is trapped in the glue, which may be impregnated with a scent or the like to attract mice.

Known glue trays of the above kind are commonly made of a plastic material, filled with the glue and packaged, in multiples, in a chipboard or other box. In use, a consumer must remove the trays from the box, dispose of the box and also of the trays after they have been used. Because the trays are made of plastic, they have a long life cycle in a landfill or dump. Also, the tray design, with its side walls and, in some cases, top flange, makes it difficult for a rodent or insect to climb into the tray.

SUMMARY OF THE INVENTION

It is a general object of the invention to provide improvements in the manufacture, construction and convenience of tray-type glue traps.

Another object of the invention is to provide a glue trap package comprising a pair of glue trays hinged together in the manner of a book, for subsequent separation and use, the package preferably being formed from a foldable blank of paperboard or like stock.

Still another object of the invention is to provide a glue tray for trapping rodents which facilitates entry of a rodent to the tray.

Yet another object of the invention is to provide a sealed glue trap package comprising a pair of interconnected preferably readily disposable glue trays, a tear-away seam which seals the package and a tear-away connection between the trays.

A further object of the invention is to provide a paperboard or like blank of sheet material suitably shaped and provided with fold lines and adhesive areas whereby the blank can be folded into a pair of trays hinged together along a common top edge so that the trays can each be provided with an internal layer of very sticky rodent-trapping glue, the traps can be closed together about said edge, top against top, to form a package and releasably sealed together along one side of the package by an adhesive strip forming part of the blank. A still further object of the invention is to form the blank so that each tray has opposite sides in the form of upwardly inclined ramps which facilitate entry of a rodent to the interior of the tray.

Additional objects of the invention, along with its features and advantages will become apparent from the ensuing description and claims read in conjunction with the attached drawings.

BRIEF DESCRIPTION OF DRAWINGS

FIG. 1B is a view similar to FIG. 1A, but showing the blank folded into a pair of interconnected trays forming the package, FIG. 6 is a plan view of a further opened-out glue trap package according to the invention.

DESCRIPTION OF PREFERRED EMBODIMENTS

Figure 1A:
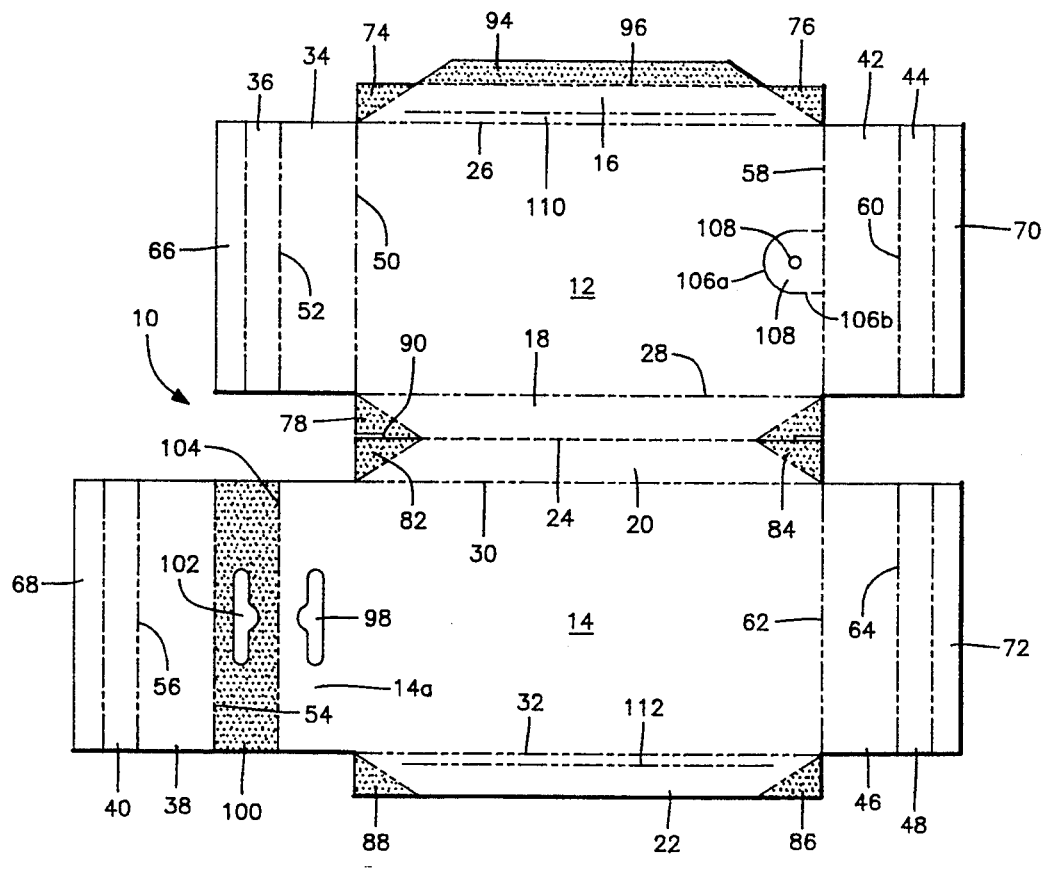
FIG. 1A is a plan view of a paper-board blank for making a glue trap package according to the invention.

As shown in FIG. 1A, a paperboard or like blank 10 for forming a glue trap package having a pair of releasably interconnected glue trays comprises a pair of main panels 12, 14 to form the bases of the respective trays, side wall panels 16, 18, 20, 22 connected to the main panels by fold lines 26, 28, 30, 32 impressed in that blank, and pairs of end wall panels 34 and 36, 38 and 40, 42, 44, 46 and 48, defined by further fold lines 50, 52, 54, 58, 60, 62 and 64. The end wall panels 36, 40, 44 and 48 are connected to foldable panels 66, 68, 70, and 72 provided with any suitable form of contact adhesive on the side not seen in FIG. 1A. The side wall panels have at their respective ends foldable triangular adhesive tabs 74, 76, 78, 80, 82, 84, 86 and 88, the tabs 78 and 82 being separated by a slit 90 in the blank and tabs 80, 84 by a like slit 92. The side wall panels 18 and 20 are connected by a tear-away perforation line 24 extending between the slits. Projecting from side wall panel 16 is an adhesive strip 94 separated from the panel 16 by a tear-away perforation line 96. Main panel 14 has an extension portion 14a with a suspension aperture 98 and is connected to an adhesive suspension panel 100 with a complementary suspension aperture 102 via a fold line 104. Panel 100 connects with end wall panel 38 via fold line 54. Main panel 12 has a pull-out securement tab 106 with an aperture 108, the tab 106 being slit as seen at 106a and perforated at 106b to facilitate separation in use. Side wall panels 16 and 22 are provided with glue level indicator lines 110, 112.

Figure 5:
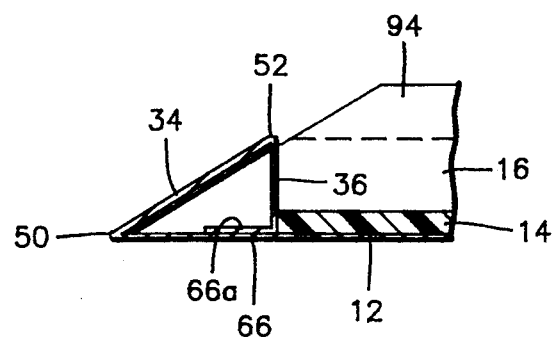
FIG. 5 is a sectional view on line 5—5 of FIG. 3.

To form the blank into a glue trap package, first the end wall panels are folded up and over and adhered to the respective main panels. This is best illustrated in FIG. 5 with reference to panels 34, 36 and 66 but it is understood that the procedure is replicated at each end of the respective main panels 12 and 14 with all of the end wall panels. Thus, as shown in FIG. 5, the panels 34, 36 and 66 are folded about fold lines 50 and 52 so that panel 34 forms an inclined ramp surface 34, panel 36 forms a vertical end wall of a tray having panel 12 as its base and adhesive panel 66 is adhered to the base panel 12 inside of panel 36. Alternatively, panel 66 may be folded in the opposite direction and supplied with adhesive as seen at 66a in FIG. 5 so as to be adhered to panel 12 outside of panel 36 (not shown).

When all of the end wall panels are folded and adhered as described above, the side wall panels 16, 18, 20 and 22 are folded up at right angles with panel 18 remaining connected to panel 20 via perforation line 24, which acts as a hinge. The adhesive tabs 74–86 are then folded down and adhered to the respective inclined ramp panels 34, 38, 42 and 46 to secure the side walls to the end wall structures and provided two glue trays 12', 14' interconnected along the hinge line 24.

It is evident that suspension panel 100 is adhered to extension portion 14a of panel 14 when forming the relevant end wall structure to form a projecting suspension means.

Each tray is then provided with a respective glue layer 114, 116 up to the level of lines 110, 112. The glue may be any type of non-drying adhesive well-known in the art and may be baited or scented to attract particular rodents or insects.

To complete the package, the trays 12', 14' are closed on one another so that the upper rims of the respective trays, defined by the peripheral side and end walls engage one another. The adhesive strip 94 is then adhered to the outside of side wall 22 of tray 14' as best seen on the left side of FIG. 3. Insofar as the glue layers are below the upper rim of each tray, no release paper is needed for covering the glue.

It is evident that the pair of glue trays 12', thus form their own packaging and no outer box is required. The outer surfaces of the package may be printed with instructions, advertising and the like and aligned apertures 98, 102 may be used to suspend the package from a display hook at a point of sale.

Figure 3:
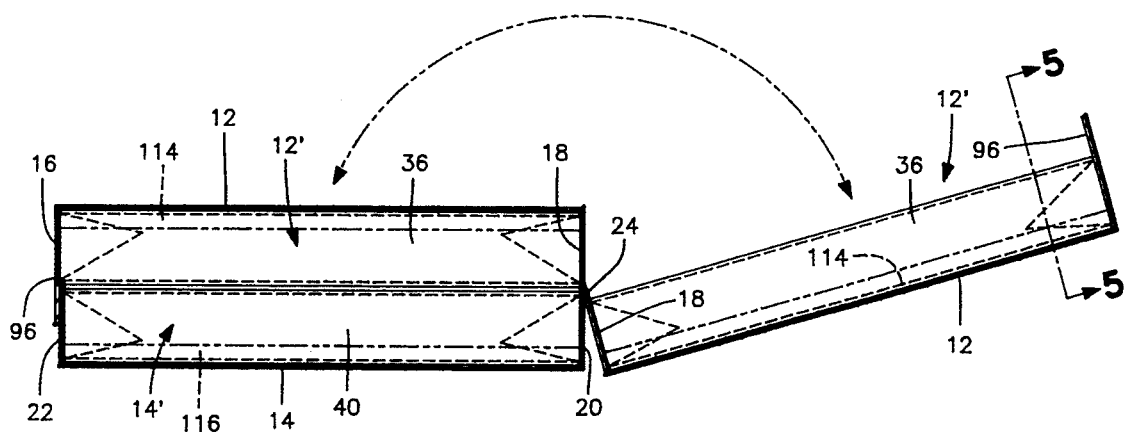
FIG. 3 is a somewhat enlarged sectional view on line 3—3 of FIG. 2 showing how the trays are closed and opened.
Figure 2:
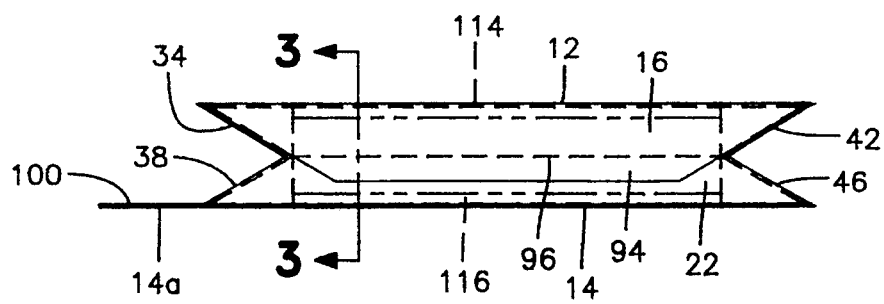
FIG. 2 is a side elevational view of the glue trap package formed by closing the respective trays together against one another.
Figure 4:
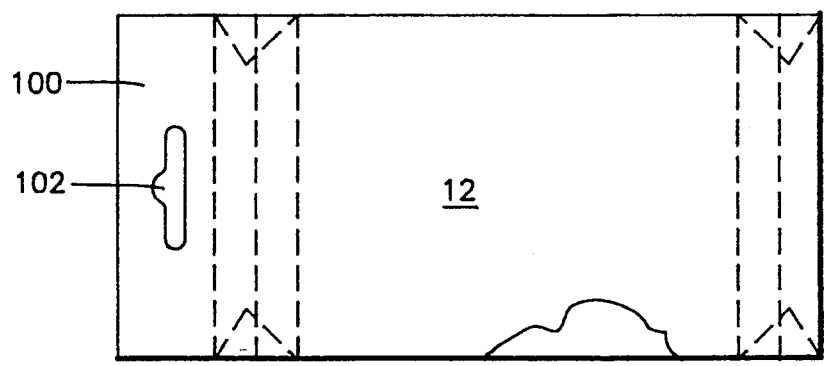
FIG. 4 is a plan view of the package.

In use, a customer opens the package by tearing perforation line 96. This allows the trays to be opened out as shown in FIG. 3. (In an alternative embodiment, a tear-away strip with spaced perforation lines may be provided.) Then, the two trays can be separated by tearing along perforation line 24. The suspension tab and apertures can be used as a hold-down means for tray 14' and tab 106 can be pulled out to form a similar hold-down means for tray 12'.

FIG. 6 shows an alternative form of glue trap package 120 according to the invention wherein a pair of conventional glue trays 122, 124 with glue layers 123, 125 are adhered by their respective base walls to opposite panels 126, 128 of a foldable card 130. The card has a central spine 132 defined by fold lines 133, 134 at least one of which may be perforated. The card may thus be hinged about the spine like a book or folder and the trays, which may be plastic trays, are positioned to close on one another with their upper rims in engagement. Releasable closure means is again provided for the package when closed which may comprise a fold-over strip 136 with a perforation line 138 and an adhesive band 140. When the card 130 is folded closed, strip 136 is folded over around edge 142 of the card and strip 136 is adhered to the back of panel 128. To release and open the package, strip 136 is torn along line 138. Other forms of closure may also be provided. The package again has an alignable suspension and hold-down apertures 144, 146. When the package is opened out, the trays can be separated along perforation lines 133 or 134. The package again forms its own outer wrapper and printing may again be provided on its outer surfaces.

While only preferred embodiments of the invention have been described herein in detail, the invention is not limited thereby and modifications can be made within the scope of the attached claims.

I claim:

1. A glue trap package comprising a pair of glue trays each having a base wall and upstanding peripheral walls defining an upper rim for each tray, a layer of non-drying adhesive in each tray for trapping vermin, a hinge connection between one pair of adjacent peripheral walls of the respective trays, the trays being closed on one another with their upper rims in engagement, and a releasable closure between another pair of adjacent peripheral walls of the respective trays allowing the trays to be opened out in the manner of a book when said closure is released, said hinge connection being defined by a tear-away perforated connection between respective rim portions of said one pair of adjacent walls, the base walls and peripheral walls of both said trays being formed by respective panels of a folded blank of flexible sheet material, said peripheral walls of each tray comprising a pair of side walls and a pair of end walls and wherein said hinge connection is between adjacent side walls of each tray which are juxtaposed to each other and wherein said releasable closure is between the other side walls of each tray, the releasable closure comprising an adhesive panel of said blank extending from a side wall of one of the trays and being adhered to the adjacent side wall of the other tray and at least one tear-away perforation line extending along said adhesive panel for releasing the closure.

2. A glue trap package as defined in claim 1, wherein the folded over panels forming an end wall of one of said trays are connected to a pair of folded over and projecting suspension panels provided with a suspension aperture for suspending the package from a display hook.

3. A glue trap package comprising a pair of glue trays each having a base wall and upstanding peripheral walls defining an upper rim for each tray, a layer of non-drying adhesive in each tray for trapping vermin, a hinge connection between one pair of adjacent peripheral walls of the respective trays, the trays being closed on one another with their upper rims in engagement, and a releasable closure between another pair of adjacent peripheral walls of the respective trays allowing the trays to be opened out in the manner of a book when said closure is released, said hinge connection being defined by a tear-away perforated connection between respective rim portions of said one pair of adjacent walls, the base walls and peripheral walls of both said trays being formed by respective panels of a folded blank of flexible sheet material, said peripheral walls of each tray comprising a pair of side walls and a pair of end walls and wherein said hinge connection is between adjacent side walls of each tray which are juxtaposed to each other and wherein said releasable closure is between the other side walls of each tray, the end walls of each tray being formed by folded over panels of the blank defining upwardly inclined ramps facilitating entry of a rodent to the respective trap in use, panels of the blank defining the side walls of the respective trays being formed by panels of the blank having adhesive end portions which are folded over and adhered to the folded over panels forming an end wall of the respective trays.

4. A glue trap package comprising a sheet of flexible material having multiple panels folded into a pair of trays each having a base wall panel and upstanding peripheral side wall and end wall panels defining an upper rim for each tray, the trays being interconnected by a hinge connection defined between upper rim portions of one pair of adjacent side wall panels of the respective trays, the trays being closed on one another about said hinge connection with their upper rims in engagement, a layer of non-drying adhesive in each tray, and a releasable closure between another pair of adjacent peripheral wall panels of the respective trays allowing the trays be opened out about said hinge connection in the manner of a book when said closure is released, the releasable closure comprising an adhesive panel extending from a peripheral wall panel of one of said trays and being adhered to an adjacent peripheral wall panel of the other tray, and at least one tear-away perforation line along said adhesive panel.

5. A package as defined in claim 4, wherein said hinge connection comprises a perforation line providing for tear-away separation of the respective trays when the package is opened.

6. A package as defined in claim 4, wherein the end wall panels comprise a plurality of folded over panels at each end of each tray including an upwardly inclined panel defining a ramp surface facilitating entry of a rodent to the respective tray.

7. A package as defined in claim 6, including folded over tabs at opposite ends of the respective side wall panels and adhered to the respective end wall panels.

8. A glue trap package comprising a sheet of flexible material having multiple panels folded into a glue tray having a base wall panel and upstanding peripheral side wall and end wall panels defining an upper rim for the tray, a layer of non-drying adhesive in the tray, said sheet having further panel means defining a closure hinged to one of said side wall panels along said rim and being folded over into engagement with the rim of the tray, an adhesive panel extending from said closure and adhered to another peripheral panel of the tray to form a seal for said closure, and at least one perforation line along said adhesive panel for breaking said seal and allowing the closure to uncover said tray.

9. A glue trap package as defined in claim 8, wherein said closure comprises a second tray formed from said further panel means with a further layer of non-drying adhesive in said second tray and said trays being closed on one another with their rims in engagement.

* * * * *